Oct. 12, 1948.    H. O. SCHULTZ    2,451,123
MULTIPLE DRILL TEMPLATE
Original Filed Nov. 29, 1944
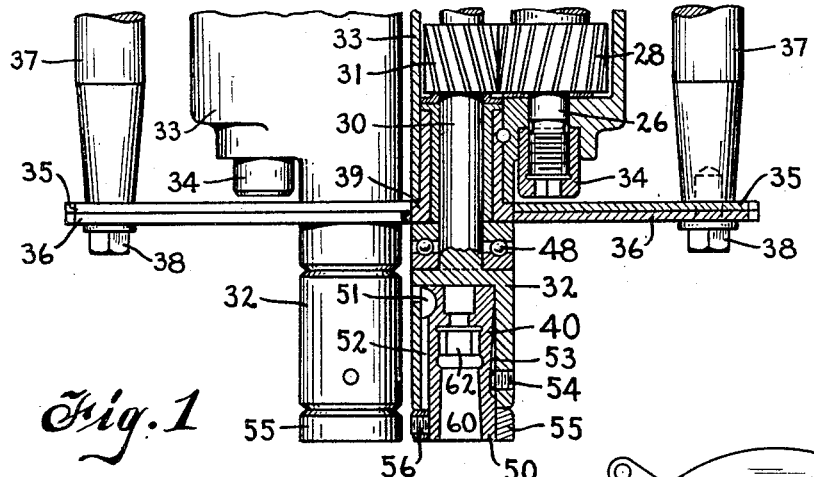
Fig. 1
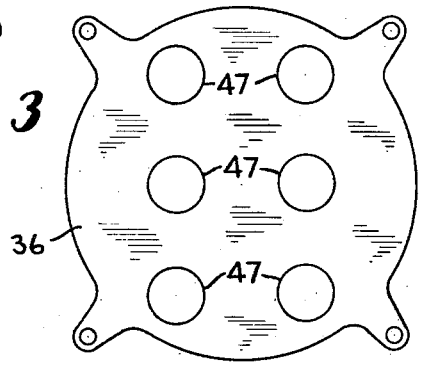
Fig. 3
Fig. 2
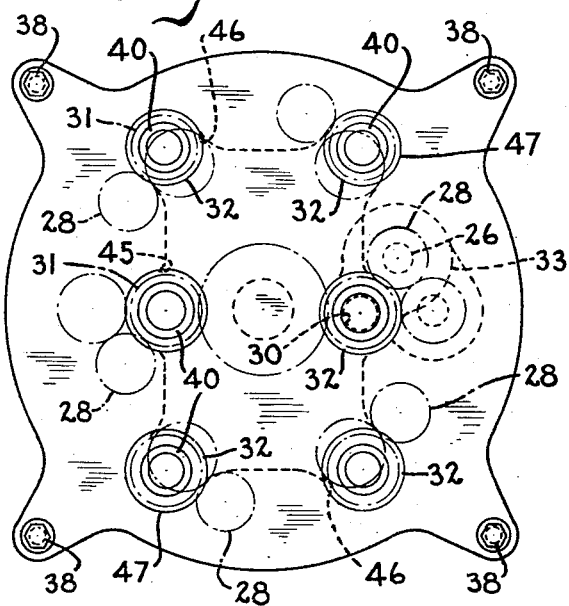
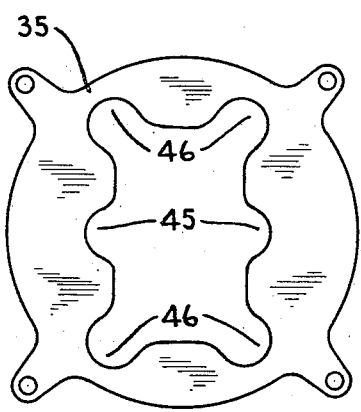
Fig. 4
INVENTOR.
Henry O. Schultz
BY
Lieber & Lieber
ATTORNEYS.

Patented Oct. 12, 1948

2,451,123

UNITED STATES PATENT OFFICE 2,451,123

MULTIPLE DRILL TEMPLATE

Henry O. Schultz, Milwaukee, Wis., assignor to H. O. Schultz, Inc., Milwaukee, Wis., a corporation of Wisconsin Original application November 29, 1944, Serial No. 565,628, now Patent No. 2,441,722, dated May 18, 1948. Divided and this application February 28, 1948, Serial No. 12,031

7 Claims. (Cl. 77—62)

This invention relates in general to improvements in the art of drilling, and relates more particularly to improvements in the construction and operation of multiple drill template assemblages, and is a division of my copending application Serial No. 565,628, filed November 29, 1944, for Adjustable drill head, now Patent Number 2,441,722, dated May 18, 1948.

The principal object of my invention is to provide an improved template assemblage for adjustable drill heads or multiple drill mechanisms, which is simple and compact in construction, flexible in its adaptations, and highly efficient in operation.

It has heretofore been proposed to provide various types of so-called multiple drill heads for simultaneously driving two or more twist drills or the like, and for effecting predetermined setting of the drill points so as to permit the formation of holes arranged in diverse patterns. However, these prior devices have not proven entirely satisfactory for various reasons. While some of the previous drill driving heads were capable of adjustment so as to vary the radii of bolt circles on which the groups of holes could be simultaneously drilled, the drillings were limited to circular patterns and could not be readily applied to straight line, rectangular, and other diverse and irregular arrangements, thus materially restricting the utility of these appliances. Furthermore, in most of the prior multiple drill drives, the drill driving spindles were not properly supported against undesirable displacement after adjustments were effected, and they were also considerably limited as to the range of adjustment of the drills. In addition, considerable care and tedious manipulation were necessary in effecting adjustments of the drill driving spindles, and valuable time was consumated in setting up the prior multiple drill heads for the particular work to be performed. For these and other specific reasons, the previously proposed multiple drill heads have not proven especially popular with the trade, except perhaps for special purposes.

In my co-pending application, hereinabove identified, there is disclosed an improved multiple drill driving assemblage which has met with widespread approval and acceptance and wherein two or more drill driving spindles are quickly and conveniently universally adjustable throughout an extensive range.

It is accordingly a more specific object of the present invention to provide improved instrumentalities for use with multiple drill driving mechanisms, which aid in effecting rapid and accurate adjustments of the drill driving spindles in a minimum amount of time, and furthermore function to effectively retain and support the drills against undesirable displacement after the adjustment or change in location thereof has been effected.

Another specific object of this invention is to provide an improved template assemblage adapted for use with adjustable drill heads for quickly and accurately effecting selective positioning of the drill axes in a variety of definite patterns involving either straight or curved row arrangement of these axes and diverse spacing thereof.

A further specific object of my invention is to provide improved instrumentalities for permitting and aiding in the preselected location of the several drills of a multiple drill head in circles, polygons, or other patterns throughout an area of considerably greater magnitude than the cross-sectional area of the head.

Still another specific object of this invention is to provide improved instrumentalities for effecting rapid and accurate selective positioning of a multiplicity of individual drill spindles, and subsequent positive retention of the spindles in the desired locations.

Another specific object of my invention is to provide a durable multi-drill assembly and template therefor which may be manufactured and maintained at moderate cost while being extremely flexible in its adaptations, and wherein drills of various sizes may be readily applied and removed and are most effectively driven while in use.

These and other specific objects and advantages of the invention will be apparent from the following detailed description.

A clear conception of the several features constituting my invention, and of the mode of constructing and of utilizing templates for multiple drill heads embodying the improvement, may be had by referring to the drawings accompanying and forming a part of this specification wherein like reference characters designate the same or similar parts in the various views.

Fig. 1 is a fragmentary part sectional side elevation of a typical multiple spindle drill head built according to the invention disclosed in my co-pending application Serial No. 565,628, now Patent No. 2,441,722, dated May 18, 1948, and embodying one of my improved template structures, the section having been taken radially through one of the spindle adjusting mechanisms and drives;

Fig. 2 is a somewhat reduced bottom view of a drill head such as shown in Fig. 1 and having six drill spindle drives associated therewith, showing the spindles and the drill adaptors thereof positioned and held in symmetrical rectangular arrangement;

Fig. 3 is a further reduced plan view of the lower positioning and spindle retaining template which is finally associated with the multiple drill head to hold the spindles as in Fig. 2; and Fig. 4 is a similarly reduced plan view of the upper template which is associated with the drill head of Fig. 2 to effect quick positioning of the spindles into the pattern formation shown therein and to also assist in holding the spindles in desired position;

While the invention has been shown and described herein as being embodied in a typical six spindle gear driven multiple drill head having special drill adaptors associated therewith, it is not my desire or intention to thereby unnecessarily restrict the scope or limit the utility of the improvements which are obviously more generally applicable.

Referring to the drawing, the improved typical multiple drill head and improved template therefor comprise, in general, a series of drill spindle shafts 30, shown herein as six in number, each having a driving gear 31 coacting with an adjacent idler gear 28 and also having a drill adaptor socket 32 at its lower end, the drill spindle shafts being selectively universally swingable and adjustable relative to each other about a series of idler shafts 26 and counter shafts, not shown, driven through mechanism, fully shown and described in my co-pending application, Serial No. 565,628, but not shown herein, and housed within an upper casing; a spindle housing 33 rotatably supporting each shaft 30 and enclosing the adjacent gear 31, these housings being swingably suspended from adjacent idler housings, not shown, for adjustment about the axes of the corresponding idler shafts 26 as fully disclosed in my above-identified co-pending application; a clamping nut 34 coacting with end screw threads formed on each idler shaft 26 and with the adjacent spindle housing 33 to firmly lock the same in various positions of adjustment; and a pair of upper and lower mutually coacting spindle retaining templates 35, 36 respectively, suspended from the main upper casing, not shown, by means of rigid columns 37 and cap screws 38, the templates 35, 36 being formed to engage the spindle housings 33 through bushings 39 carried by these housings.

The various working parts may be suitably lubricated and sealed, and the drill spindle shafts 30 are selectively universally adjustable to any desired pattern as fully described in my co-pending application, Serial No. 565,628, wherein the several novel and improved features of the adjustable drill head mechanism are covered. Drills of the desired size may be detachably connected to each of the sockets 32 by means of an improved adaptor 40 which permits rapid and convenient interchanging of drills. Each of these adaptors comprises, in general, an elongated cylindrical member 50 snugly fitted within the bore of the spindle socket 32 and having a key 51 secured to one side thereof which is slidably cooperable with a key-way 52 formed in the socket, while its opposite side is provided with a tapered groove 53 adapted to coact with a retaining screw 54 carried by the socket 32; a thrust collar 55 having screw thread coaction with the outer end of the member 50 and being provided with another set screw 56 adapted to coact with a recess formed in the member 50, so as to lock this member in axially adjusted position; a split collet, shown in detail in my co-pending application hereinabove identified, having tapered jaws cooperable with the shank of a twist drill and the tapered bore 60 of the member 50, and also being provided with a polygonal upper end adapted to snugly fit a similarly polygonal pocket 62 formed in the member 50; and a drill clamping screw cooperable with the member 50 and with the collet in order to draw the latter within the bore 60 so as to cause the jaws of the collet to firmly clamp the drill shank. The collets may be provided with drill shank engaging bores of different diameters adapted to receive drills of different sizes, but all having tapered jaws which are snugly cooperable with the tapered bore 60 of the member 50, and the upper ends of the collet jaws are separated by a slot which is formed to fit the upper flat ends of the drill shanks. The improved adaptors 40 are therefore capable of cooperating with standard twist drills of various sizes, and these drills may obviously be readily applied or removed and are firmly clamped within the collets when properly applied thereto.

Since neither the adaptors, the collect received thereby nor the mechanisms for driving the drill spindle shafts 30 and for permitting swinging movement and adjustability of these spindles constitute a part of the present invention, only sufficient structure has been shown and described herein as is necessary for an understanding of the application and mode of use of the improved template structure forming the subject matter of this invention; and this template assemblage may, of course, be readily utilized with any adjustable multiple drill head wherein any suitable adaptors and collets are utilized and need not be confined to multiple drill head assemblages of the type shown herein as merely a typical example.

The various adjustments of the individual spindle shafts 30 may be quickly and conveniently made upon removal of the templates 35, 36 and release of the clamping nuts 34, and these templates may be formed of sheet metal and of diverse patterns corresponding to the work which is to be performed. As illustrated in Figs. 2, 3, and 4, the templates 35, 36 have been constructed so as to position the drill spindle shafts 30 in rectangular formation, and when utilizing templates of a definite predetermined shape, the nuts 34 may be released sufficiently to permit relatively free swinging of the spindle housings 33 and idler housings, not shown, about their respective shafts whereupon the upper template 35 with its continuous edge forming the predetermined pattern, may be applied to the columns 37 with the bushings 39 projecting through the central opening. The bushings 39 may then be swung and positioned within the notches 45, 46 of the predetermined template pattern, and the nuts 34 should then be tightened to clamp the spindle housings 33 and the respective idler housings in the desired position. The lower template 36 may thereafter be applied from beneath and both of the templates 35, 36 should finally be firmly secured to the columns 37 with the aid of the set screws 38, whereupon the notches 45, 46 and the alined round holes 47 of the lower template 36 will positively maintain the spindle shafts 30 in proper desired position to conform with the predetermined pattern. In the typical drill head shown herein by way of example, antifriction or ball thrust bearings 48 are preferably introduced between the sockets 32 and bushings 39, as shown in Fig. 1, in order to avoid having the end thrust introduced by the individual drills shift the spindle shafts 30 upwardly into the housings 33.

During normal use of the improved typical assemblage, templates having patterns of any suitable configuration may be applied to the columns 37 as hereinabove fully described; and the spindle sockets 32 may be positioned, with the aid of the proper selected templates, to produce any desired pattern within the range of swinging adjustment afforded by the spindle housings 33 and idler housings, not shown. The individual twist drills may obviously be firmly clamped within the sockets 32 with the aid of the improved adaptors 40, and the collets, not shown, will permit the application of twist drills of different diameters, so that some of these collets may be provided with drills of a predetermined diameter while others may be provided with drills of larger or smaller diameters, thus enhancing the flexibility of the unit to a maximum. When the clamping nuts 34 have been placed into clamping position, and the templates 35, 36, as well as the pre-selected drills, have been properly applied, power may be applied to the main driving shaft, and such application of power to the main driving shaft will thereafter be transmitted through the several trains of gears, as fully described in my co-pending application, Serial No. 565,628, to the spindle shafts 30, and from thence to the individual drills so as to permit accurate drilling of holes following the preselected pattern formed by the notched edge of the template 35 and the prearranged disposition of the holes 47 in the plate 36. The use of the templates 35, 36 is particularly desirable when a large number of successive groups of holes are to be drilled according to a predetermined pattern, and these templates 35, 36 will then afford additional support for the housings 33 and spindle shafts 30. In the assemblage shown herein, the thrust induced during drilling operations upon the spindle shafts 30 will be taken up by the antifriction bearings 48 and the gears 31 and 28 will therefore be relieved of end thrust and will be freely rotatable with the application of minimum power.

From the foregoing detailed description, it will be apparent that my present invention contemplates provision of improved instrumentalities for aiding in effecting rapid and accurate adjustments of the drill driving spindles of a multiple drill mechanism, and which further function to effectively retain and insure positive positioning of the multiplicity of drills in the desired pattern. The templates 35, 36 may be formed with any desired predetermined pattern, and obviously afford a sturdy support for the housings 33 and spindle shafts 30 of the multiple drill head, thereby positively insuring against undesirable displacement of the several drills after adjustment thereof has been effected.

Through use of the improved templates, quick and accurate adjustments of the drill spindles 30 by persons of ordinary skill are possible, and the drills may be positioned in a variety of definite patterns involving either straight or curved row arrangements. The improved template structures may obviously be manufactured at moderate cost, and may be utilized to effect considerable savings in time during set-up of the machines with which they are used as well as to insure accuracy in the work performed by the drills. These templates may be readily used with practically any known type of drill head assemblages having a multiplicity of adjustable drill driving spindles; and although they have been shown and described herein as particularly applicable to adjustable drill heads of the type fully disclosed in my co-pending application above-identified, the utility thereof should not be limited thereto. These improved templates are extremely simple in construction, application and use and may be readily formed of any suitable and available sheet metal; and they have proven highly satisfactory and efficient in actual commercial use.

It should be understood that it is not desired or intended to limit this invention to the exact details of construction, or to the precise mode of use, herein shown and described; since various modifications within the scope of the appended claims may occur to persons skilled in the art to which this invention pertains; and template assemblages embodying various designs other than that herein particularly shown and described may be utilized in like manner and with equal success.

I claim:

1. A template assemblage for use with a drill head wherein a plurality of drill spindles are adjustable laterally of each other, said template assemblage comprising, a template having a common opening defining a predetermined pattern, means for rigidly positioning said template with respect to said drill head whereby all of said spindles are freely laterally movable within the common opening of said template for adjustment purposes, and a second template having a series of independent holes defining the same pattern and within which said spindles are snugly confinable but freely rotatable.

2. A template assemblage for use with a drill head wherein a plurality of drill spindles are adjustable laterally of each other, said template assemblage comprising, a template having a common opening defining a predetermined pattern, means for rigidly positioning said template with respect to said drill head whereby all of said spindles are freely laterally movable within the common opening of said template for adjustment purposes, a second template having a series of independent holes defining the same pattern and within which said spindles are snugly confineable but freely rotatable, and means for clamping said templates in superimposed condition.

3. A template assemblage for use with a drill head wherein a plurality of depending drill spindles are adjustable laterally of each other, said template assemblage comprising, a template having a common opening defining a predetermined pattern, supporting means for rigidly suspending said template from said drill head whereby all of said spindles are freely laterally movable within the common opening of said template for adjustment purposes, and a second template having a series of independent holes corresponding in number to said drill spindles and defining the same pattern as the opening of said first-mentioned template, said spindles being snugly confineable but freely rotatable within said independent holes.

4. A template assemblage for use with a drill head wherein a plurality of depending drill spindles are adjustable laterally of each other, said template assemblage comprising, a template having a common opening defining a predetermined pattern, supporting means for rigidly suspending said template from said drill head whereby all of said spindles are freely laterally movable within the common opening of said template for adjustment purposes, a second template having a series of independent holes corresponding in number to said drill spindles and defining the same pattern as the opening of said first-mentioned template, said spindles being snugly confineable but freely rotatable within said independent holes, and means for clamping said templates in superimposed condition.

5. A template assemblage for use with a drill head wherein a plurality of drill spindles are adjustable laterally of each other, said template assemblage comprising, a template carried by said drill head and having a common opening defining a predetermined pattern within which all of said spindles are freely laterally movable for adjustment purposes, and another template having a series of independent holes defining the same pattern and within which said spindles are snugly confineable but freely rotatable.

6. A template assemblage for use with a drill head wherein a plurality of drill spindles are adjustable laterally of each other, said template assemblage comprising a template having a continuous edge portion defining a predetermined pattern, means for rigidly positioning said template with respect to said drill head whereby all of said spindles are freely movable against said continuous pattern-forming edge portion for adjustment purposes, and a second template having a series of independent holes defining the same pattern and within which said spindles are snugly confineable but freely rotatable.

7. A template assemblage for use with a drill head wherein a plurality of drill spindles are adjustable laterally of each other, said template assemblage comprising a template having a continuous edge portion provided with notches defining a predetermined pattern, means for rigidly positioning said template with respect to said drill head whereby all of said spindles are freely movable against said continuous edge portion and within the pattern-forming notches thereof for adjustment purposes, and a second template having a series of independent holes defining the same pattern and within which said spindles are snugly confineable but freely rotatable.

HENRY O. SCHULTZ.

No references cited.